(12) United States Patent
Carnahan et al.

(10) Patent No.: US 9,767,937 B2
(45) Date of Patent: Sep. 19, 2017

(54) CONDUCTIVE ELASTIC COMPOSITE

(71) Applicants: David L. Carnahan, Needham, MA (US); Joe Zakielarz, Wilmington, DE (US)

(72) Inventors: David L. Carnahan, Needham, MA (US); Joe Zakielarz, Wilmington, DE (US)

(*) Notice: Subject to any disclaimer, the term of this patent is extended or adjusted under 35 U.S.C. 154(b) by 335 days.

(21) Appl. No.: 13/770,559

(22) Filed: Feb. 19, 2013

(65) Prior Publication Data
US 2013/0214214 A1    Aug. 22, 2013

Related U.S. Application Data

(60) Provisional application No. 61/599,834, filed on Feb. 16, 2012.

(51) Int. Cl.
H01B 1/24 (2006.01)
B82Y 30/00 (2011.01)

(52) U.S. Cl.
CPC ............ H01B 1/24 (2013.01); B82Y 30/00 (2013.01); Y10S 977/742 (2013.01); Y10S 977/752 (2013.01); Y10S 977/783 (2013.01)

(58) Field of Classification Search
None
See application file for complete search history.

(56) References Cited

U.S. PATENT DOCUMENTS

| 7,527,750 | B2 | 5/2009 | Howard |
| 7,696,275 | B2 | 4/2010 | Slay et al. |
| 7,785,701 | B2 | 8/2010 | Noguchi et al. |
| 8,250,927 | B2 | 8/2012 | Anand et al. |
| 2008/0254296 | A1* | 10/2008 | Handa et al. ............ 428/408 |
| 2011/0186775 | A1* | 8/2011 | Shah et al. ............ 252/182.32 |

OTHER PUBLICATIONS

Vikas Mittal, editor. "Polymer Nanotube Nanocomposites: Synthesis, Properties and Applications", published by John Wiley & Sons, copyright 2010; sections are from chapter 7 on pp. 177-179 which are attached to the case file as a PDF and accessed from Google eBooks on Apr. 20, 2015.*
Kirpatrick, Percolation and Conduction, Reviews of Modern Physics, Oct. 1973, vol. 45, No. 4, 574-588.

* cited by examiner

Primary Examiner — Katie L Hammer
(74) Attorney, Agent, or Firm — Pandiscio & Pandiscio

(57) ABSTRACT

A conductive elastic composite that retains conductivity despite stretching, wherein the conductive elastic composite comprises an elastomeric matrix, carbon nanotubes and carbon fibers.

4 Claims, 2 Drawing Sheets

| Sample | Fillers | b:a | Conditions | R0 | Rp | R10% | Notes | Stretch | Rpost |
|---|---|---|---|---|---|---|---|---|---|
| Date | % | ratio | | ohms | ohms | ohms | | | ohms |
| adidas | cblack | | extruded | 878 | 665 | 284 | | | |
| 9/23/2010 | 1%SWNT | 200:100, S2021 | static mixer+stir, 80C 2hr | 3.20E+06 | 4.00E+06 | | top | | |
| 9/24/2010 | 1%SWNT | 200:100, S2021 | stir, 80C 96h | 1.08E+06 | 8.50E+05 | 2.25E+06 | top | | |
| 100510 | 2%SWNT | 6b-4a, S2021 | stir, 80C 96h | 6.89E+05 | 9.49E+05 | 2.30E+06 | top | | |
| 101310 | 2%M | 7B-4A,S2021 | stir, 80C 96h | 8.54E+05 | 9.78E+05 | 4.10E+07 | top | | |
| 101310 | 2%M | 6B-4A,S2021 | stir, 80C 96h | 1.04E+06 | 1.03E+06 | - | top | | |
| 102210 | 1%M-5%AGM95 | 100:29, CLC1A | stirred, cure 40C, 24hr | 71334 | 63273 | - | topside | | |
| 102210 | 1%M-5%AGM95 | 100:29, CLC1A | stirred, cure 40C, 24hr | 322485 | 638121 | - | bottom side | | |
| 101810 | 1%M-5%AGM95 | 100:29, CLC1A | stirred, cure 40C, 24hr | 6146 | 8511 | 51950.00 | top | | |
| 101810 | 2%M-5%AGM95 | 100:29, CLC1A | stirred, cure 40C, 24hr | 948 | 2808 | | under cured | | |
| 101810 | 1%M-10%AGM95 | 100:29, CLC1A | stirred, cure 40C, 24hr | 593 | 707 | 6077 | top | | |
| 101810 | 2%M-10%AGM95 | 100:29, CLC1A | stirred, cure 40C, 24hr | 213 | 224 | 1000 | top | | |
| 102210 | 3%M-4%AGM95 | 100:29, CLC1A | stirred, cure 40C, 24hr | 451 | 389 | 925 | topside, 105% of L0 | | |
| 102210 | 3%M-4%AGM95 | 100:29, CLC1A | stirred, cure 40C, 24hr | 1609 | 1134 | 2000 | bottom | | |
| 102210 | 4%M-3%AGM95 | 100:29, CLC1A | stirred, cure 40C, 24hr | 701 | 559 | 1094 | top | | |
| 102210 | 4%M-3%AGM95 | 100:29, CLC1A | stirred, cure 40C, 24hr | 791 | 691 | 1408 | bottom | | |
| 102210 | 5%M-2%AGM95 | 100:29, CLC1A | stirred, cure 40C, 24hr | 332 | 377 | 477 | top | | |
| 102210 | 5%M-2%AGM95 | 100:29, CLC1A | stirred, cure 40C, 24hr | 770 | 572 | 877 | bottom | | |
| 102710 | 4%M-3%AGM95 | 100:29, CLC1A | stirred, cure 40C, 24hr | 727 | 595 | 1410 | top | 38% | |
| 102710 | 4%M-3%AGM95 | 100:29, CLC1A | stirred, cure 40C, 24hr | 727 | 983 | 1926 | bottom | 38% | |
| 102710 | 3%M-4%AGM95 | 100:29, CLC1A | stirred, cure 40C, 24hr | 1347 | 971 | 2112 | top | 20% | |
| 102710 | 3%M-4%AGM95 | 100:29, CLC1A | stirred, cure 40C, 24hr | 2260 | 1116 | 2512 | bottom | 20% | |
| 102710 | 2%M-5%AGM95 | 100:29, CLC1A | stirred, cure 40C, 24hr | 2545 | 1892 | 12641 | top | | |
| 102710 | 2%M-5%AGM95 | 100:29, CLC1A | stirred, cure 40C, 24hr | 4670 | 3268 | 12672 | bottom | x | |
| 110810 | 5%M-1%AGM95 | 100:39, CLC1A | stirred, cure 40C, 48hr | 1906 | 1822 | 1531 | top | 50% | |
| 110810 | 5%M-1%AGM95 | 100:39, CLC1A | stirred, cure 40C, 48hr | 1325 | 1262 | 1569 | bottom | 50% | |
| 110810 | 4%M-2%AGM95 | 100:39, CLC1A | stirred, cure 40C, 48hr | 3633 | 3362 | 4261 | top | 100% | |
| 110810 | 4%M-2%AGM95 | 100:39, CLC1A | stirred, cure 40C, 48hr | 5927 | 4649 | 5249 | bottom | 100% | |
| 110810 | 5%M-1%CF-20 | 100:39, CLC1A | stirred, cure 40C, 48hr | | | | | | |
| 112010 | 5%M-1%AGM95 | rubber | diluted toluene, 40, 48h | 2292 | 1266 | 1155 | top | 100% | |
| 112010 | 5%M-1%AGM95 | rubber | diluted toluene, 40, 48h | 442 | 359 | 689 | bottom | 100% | |
| 121510 | 2%M-4%AGM99 | 100:39, CLC1A | stirred, cure 40C, 48hr | 2.70E+05 | 4.80E+05 | 6.10E+05 | top | 80% | |
| 121510 | 2%M-4%AGM99 | 100:39, CLC1A | stirred, cure 40C, 48hr | 5.35E+05 | 4.20E+05 | 4.50E+05 | bottom | 80% | |
| 121510 | 1%M-5%agm99 | 100:39, CLC1A | stirred, cure 40C, 48hr | 2.00E+08 | | | top | | |
| 121510 | 1%M-5%agm99 | 100:39, CLC1A | stirred, cure 40C, 48hr | 1.50E+08 | 1.20E+08 | 2.00E+08 | bottom | | |
| 121510 | 0%M-6%agm99 | 100:39, CLC1A | stirred, cure 40C, 48hr | 2.00E+08 | | | top | | |
| 121510 | 0%M-6%agm99 | 100:39, CLC1A | stirred, cure 40C, 48hr | 2.00E+07 | | | bottom | | |
| 121610 | 3%M-3%agm99 | 100:39, CLC1A | stirred, cure 40C, 48hr | 85000 | 82000 | 100000 | top | | |
| 121610 | 3%M-3%agm99 | 100:39, CLC1A | stirred, cure 40C, 48hr | 77000 | 72000 | 84000 | bottom | | |
| 121710 | 5%M-1%agm99 | 100:39, CLC1A | stirred, cure 40C, 48hr | 1070 | 633 | 867 | top | 40% | 730 |
| 121710 | 5%M-1%agm99 | 100:39, CLC1A | stirred, cure 40C, 48hr | 847 | 644 | 568 | bottom | 40% | 640 |
| 11011 | 5%M-1%agm99 | rubber | diluted toluene | 7.00E+06 | 6.60E+06 | 1.20E+07 | top | | |
| 11011 | 5%M-1%agm99 | rubber | diluted toluene | 5.00E+06 | 4.70E+06 | 1.20E+07 | bottom | | |
| 11111 | 4%M-2%agm99 | 100:39, CLC1A | stirred, cure 40C, 48hr | 4400 | 3200 | 4300 | top | | |
| 11111 | 4%M-2%agm99 | 100:39, CLC1A | stirred, cure 40C, 48hr | 4900 | 4200 | 4600 | bottom | | |
| 11211 | 4%M-2%agm99 | rubber | diluted toluene | 3580000 | 2800000 | 29000000 | top | | |
| 11211 | 4%M-2%agm99 | rubber | diluted toluene | 3100000 | 2900000 | 14000000 | bottom | | |
| 11311 | 3%M-3%agm99 | rubber | diluted toluene | 1.22E+08 | 1.15E+08 | | top | | |
| 11311 | 3%M-3%agm99 | rubber | diluted toluene | 2E+08 | 1.98E+08 | | bottom | | |
| 11411 | 6%M | rubber | diluted toluene | 3300000 | 900000 | 3000000 | top | | |
| 11411 | 6%M | rubber | diluted toluene | 1220000 | 880000 | 2200000 | bottom | | |
| 11511 | 5%M-1%agm99 | 100:39, CLC1A | FT-rogers-diluted toluene | 1700 | 1500 | 4000 | thin 0.002, porous | | |
| 012011-3 | 5%MB-1%agm99 | 100:39, CLC1A | stirred, cure 40C, 24hr | - | 1500 | 1500 | top | | |
| 012011-3 | 5%MB-1%agm99 | 100:39, CLC1A | stirred, cure 40C, 24hr | 1700 | 1150 | 1300 | bottom | | |
| 012011-4 | 5%MB-2%agm99 | 100:39, CLC1A | stirred, cure 40C, 24hr | - | 800 | 1100 | top | | |
| 012011-4 | 5%MB-2%agm99 | 100:39, CLC1A | stirred, cure 40C, 24hr | 1900 | 1200 | 700 | bottom | | |
| 012011-5a | 5%MB-3%agm99 | 100:39, CLC1A | stirred, cure 40C, 24hr | 1000 | 550 | 600 | top | | |
| 012011-5a | 5%MB-3%agm99 | 100:39, CLC1A | stirred, cure 40C, 24hr | 650 | 520 | 480 | bottom | | |
| 012011-5b | 5%MB-3%agm99 | 100:39, CLC1A | stirred, cure 40C, 24hr | 1000 | 400 | 650 | top | 20% | 570 |
| 012011-5b | 5%MB-3%agm99 | 100:39, CLC1A | stirred, cure 40C, 24hr | 700 | 550 | 620 | bottom | 20% | 560 |
| 012011-1 | 5%MH-2%agm99 | 100:39, CLC1A | stirred, cure 40C, 24hr | 904 | 373 | 362 | top | 25% | 450 |
| 012011-1 | 5%MH-2%agm99 | 100:39, CLC1A | stirred, cure 40C, 24hr | 384 | 370 | 330 | bottom | 25% | 424 |
| 12011-2a | 5%MH-3%agm99 | 100:39, CLC1A | stirred, cure 40C, 24hr | 540 | 145 | 240 | top | 30% | 600 |
| 12011-2a | 5%MH-3%agm99 | 100:39, CLC1A | stirred, cure 40C, 24hr | 150 | 105 | 330 | bottom | 30% | 600 |
| 012011-2b | 5%MH-3%agm99 | 100:39, CLC1A | stirred, cure 40C, 24hr | 500 | 140 | 230 | top | | |
| 012011-2b | 5%MH-3%agm99 | 100:39, CLC1A | stirred, cure 40C, 24hr | 230 | 140 | 170 | bottom | | |
| 41411 | 5%M-2%AGM99 | 100:39, CLC1A | FT 15s 1250, 1750 2300, cur | 2000 | 1900 | 2500 | porous-2side-tacky | 90% | 6000 |
| 41411 | 5%M-2%AGM99 | 100:39, CLC1A | FT 15s 1250, 1750 2300, cur | 2200 | 1900 | 2600 | porous-2smoothside | 90% | 6000 |
| 41411 | 5%M-1%AGM99 | 100:39, CLC1A | FT 15s 1250, 1750 2300, cur | 5100 | 4600 | 8800 | 2sided, tacky | 50% | 16000 |
| 41411 | 5%M-1%AGM99 | 100:39, CLC1A | FT 15s 1250, 1750 2300, cur | 7000 | 5800 | 9400 | 2sided, tacky | 50% | 16000 |
| 51211 | 5%M-1%AGM99 | 100:39, CLC1A | FT 20s/2000 deair, add B, 20 | 3000 | 1400 | 1800 | top | 40% | 2100 |
| 51211 | 5%M-1%AGM99 | 100:39, CLC1A | FT 20s/2000 deair, add B, 20 | 2100 | 1800 | 1600 | bottom | 40% | 2000 |

Fig. 4

CONDUCTIVE ELASTIC COMPOSITE

REFERENCE TO PENDING PRIOR PATENT APPLICATION

This patent application claims benefit of prior U.S. Provisional Patent Application Ser. No. 61/599,834, filed Feb. 16, 2012 by David L. Carnahan for CONDUCTIVE AND ELASTIC COMPOSITE, which patent application is hereby incorporated herein by reference.

FIELD OF THE INVENTION

The present invention relates, in general, to a filled elastomeric compound for use as a conductor, electrode, shield, sensor and/or other device, and in particular, to an elastomeric compound filled with two conductive, fibrous additives, namely, carbon nanotubes and carbon fibers.

BACKGROUND OF THE INVENTION

Without limiting the scope of the present invention, its background will be described with reference to conductive, filled elastomeric composites.

When particulate additives are mixed into polymeric systems at a sufficient concentration, they will touch each other. This formation of a continuous phase of particles within the polymeric system is known as percolation. If these additives are electrically conductive, they will impart conductivity to the polymeric system when added in concentrations greater than the percolation threshold concentration. When the additives are spherical, the electrical percolation threshold is theoretically achieved at a concentrations above approximately 16%. (S. Kirpatrick, Percolation and conduction, Rev Mod Phys 1973, 45 574-88).

Elastomeric compounds are materials that can undergo a large degree of elastic (i.e., full recovery) deformation. When elastomeric compounds are loaded with conductive additives to the point of percolation, they become conductive. However, because conductive additives are typically high stiffness, non-elastic particulates, when these systems are stretched, the percolating contact is lost. Accordingly, elastomeric systems have not previously been available where a high degree of conductivity persists in the stretched state.

While it is known in the art to add carbon nanotubes to polymeric systems in order to impart a variety of properties to the polymeric system, there have been no demonstrations of the retention of conductivity in the face of significant elastic deformation.

Slay et al., for example, in U.S. Pat. No. 7,696,275, disclose the use of carbon nanotubes in an elastomer as a mechanical reinforcement to improve the blow-out resistance of seals for oil well applications.

Howard, in U.S. Pat. No. 7,527,750, discloses a composition for sheet molding compounds that will impart conductivity to a molded component. While the conductivity of the filled systems in Howard could be substantial, his use of carbon black, which is nearly spherical, precludes persistent conduction when the composition is elastically stretched.

Anand et al., in U.S. Pat. No. 8,250,927, disclose a flexible, stretchable strain sensor material comprised of carbon nanotubes in an elastic matrix. Anand's described preparations achieve a gauge factor of 4 or greater by the admixing of nanotubes and carbon black in the elastic matrix, where the nanotube loading was <1% by weight. As will hereinafter be discussed, the utility of the present invention is to maintain conductivity despite the application of strain. To do so, the nanotube content in the present invention (see below) is typically greater than 3% by weight. Accordingly, the composites of the present invention have a gauge factor of less than 4. This is achieved in part by employing higher concentrations of carbon nanotubes in the present invention, but also by employing carbon nanotubes with significant lengths, e.g., >5 microns, with the present invention.

Noguchi et al., in U.S. Pat. No. 7,785,701, disclose a carbon nanofiber-filled elastomer material, having specific chemical interaction between the elastomer and the nanofiber. By contrast, and as will hereinafter be discussed in detail, with the present invention, no such specific chemical functionalization is required in order to achieve dispersion and conductivity, and as such, the present invention represents a significant advance in the state of the art.

SUMMARY OF THE INVENTION

This invention relates to an elastic matrix with a combination of additives, which result in conductance that persists despite significant stretching of the elastic matrix. The elastic matrix may be one of a number of elastic materials, e.g., those being capable of >10% elongation without permanent deformation or failure. Examples of such elastic materials include rubbers, silicones and polyurethanes, among others. Within the elastic matrix, there is disposed a combination of additives. This combination of additives comprises carbon fibers, between about 1 and 10 microns in diameter and approximately 200-10,000 microns in length, and carbon nanotubes, approximately 10 nm in diameter and approximately 5-20 microns in length or longer. Preferably the carbon fiber is about 5 microns in diameter and approximately at least 1000 microns in length, and the carbon nanotubes are approximately 10 nm diameter and approximately 20 microns in length or longer.

In one preferred form of the present invention, there is provided a conductive elastic composite that retains conductivity despite stretching, wherein the conductive elastic composite comprises an elastomeric matrix, carbon nanotubes and carbon fibers.

In another preferred form of the present invention, there is provided a conductive elastic composite that can be elastically stretched to >120% of its original length, without more than a 20% change in electrical resistance, comprising an elastomeric matrix, carbon nanotubes and carbon fibers.

In another preferred form of the present invention, there is provided a method for preparing a conductive elastic composite, the method comprising the steps of:

dispersing carbon nanotubes and carbon fibers in a matrix phase with or without additional solvent;

de-airing the resulting compound;

mixing a curing agent, if needed, into the compound;

de-airing the mixed composite;

casting the composite into a mold or coating it on a substrate; and providing suitable time and temperature for the composite to cure, or solvents to evaporate.

In another preferred form of the present invention, there is provided a method for preparing a conductive elastic composite, the method comprising the steps of:

dispersing carbon nanotubes and carbon fibers in a solvated rubber;

de-airing the resulting composite;

casting the composite into a mold or coating it on a substrate; and providing suitable time and temperature for the fugitive solvent to evaporate.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein:

FIG. 4 is a table of various formulations produced according to the present invention.

DETAILED DESCRIPTION OF THE PREFERRED EMBODIMENTS

Figure 1:
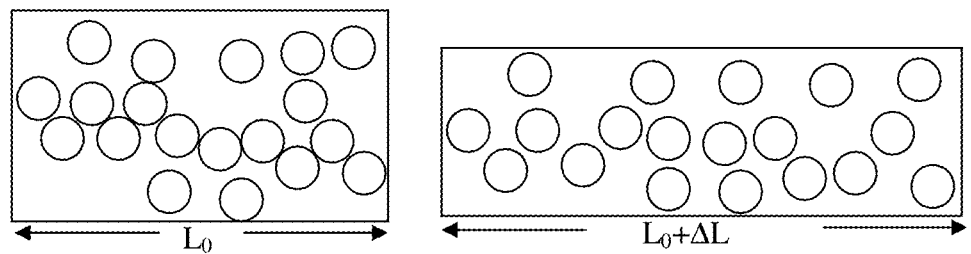
FIG. 1 illustrates a composite containing spherical conductive fillers of the prior art in unstretched ($L=L_0$) and stretched ($L=L_0+\Delta L$) states, showing loss of interparticle contact when stretched—such loss of interparticle contact implies rapid loss of conduction.
Figure 2:
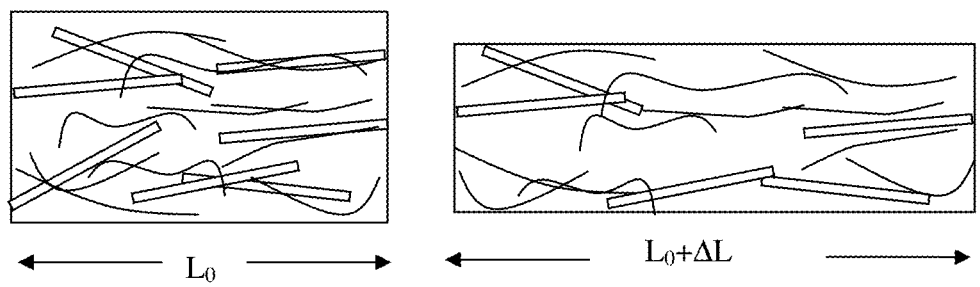
FIG. 2 illustrates a novel conductive elastic composite formed in accordance with the present invention, wherein the novel conductive elastic composite comprises two types of elongated conductive fillers, carbon fibers and carbon nanotubes, in un-stretched ($L=L_0$) and stretched ($L=L_0+\Delta L$) states, showing very little change in percolation when stretched, because the carbon fibers become aligned parallel to the stretching direction and the carbon nanotubes combine with the carbon fibers to maintain a percolating network.
Figure 3:
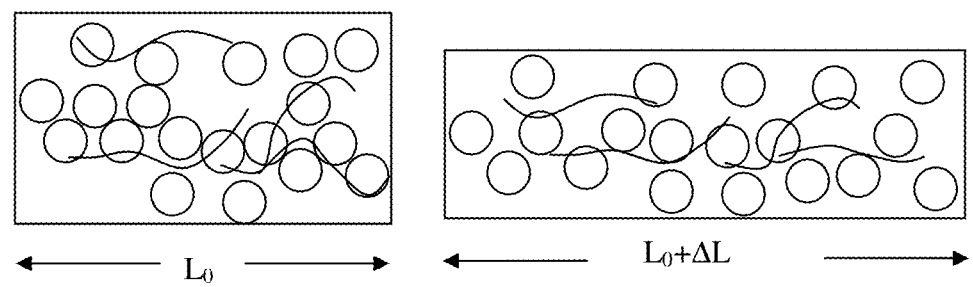
FIG. 3 illustrates another novel conductive elastic composite formed in accordance with the present invention, wherein the novel conductive elastic composite comprises two types of conductive fillers, carbon black and carbon nanotubes, in un-stretched ($L=L_0$) and stretched ($L=L_0+\Delta L$) states. With this form of the invention, the number of persistent connections is reduced as the elastomer is stretched, but the carbon nanotubes will maintain some level of percolation—the novel conductive elastic composite shown in this figure may be used as a strain sensor or other device.

The present invention comprises a novel elastic composite. This novel conductive elastic composite comprises an elastic matrix with a combination of additives, which result in conductance that persists despite significant stretching of the elastic matrix. The elastic matrix may be one of a number of elastic materials, e.g., those being capable of >10% elongation without permanent deformation or failure. Examples of such elastic materials include rubbers, silicones and polyurethanes, among others. Within the elastic matrix, there is disposed a combination of additives. This combination of additives comprises carbon fibers, between about 1 and 10 microns in diameter and approximately 200-10,000 microns in length, and carbon nanotubes, approximately 10 nm in diameter and approximately 5-20 microns in length or longer. Preferably the carbon fiber is about 5 microns in diameter and approximately at least 1000 microns in length, and the carbon nanotubes are approximately 10 nm diameter and approximately 20 microns in length or longer.

The combination of these two additives is synergistic in nature. The conductivity, for example, of an elastomer with 5% loading of either carbon nanotubes alone or carbon fibers alone is not as high as a mixture of the two additives, e.g., approximately 4% nanotubes and approximately 1% carbon fibers. Without wishing to be limited by theory, it is currently believed that this synergistic effect can be explained by recognizing that the large diameter carbon fibers align during processing to boost the conductivity in the processing direction, but are not present in sufficient concentration to create a percolating network alone. The carbon fibers contact a large number of carbon nanotubes, which do create a percolating network. Carbon nanotubes cannot be expected to align during processing, as they are orders of magnitude smaller than any freestanding component made from the elastomeric composition. The presence of the carbon fibers, however, may promote alignment of the carbon nanotubes. In components having thin cross-sections, however, both components may be expected to align due to shear forces during casting or molding.

We mapped the elasticity of the conductive elastic composites as a function of the additives (i.e., the carbon fibers and the carbon nanotubes). The elasticity of the conductive elastic composite was reduced by the addition of the additives, and this effect was stronger with the addition of carbon fibers than with the addition of carbon nanotubes. To retain significant elasticity in the cured conductive elastic composite, we have found that the carbon fiber percentage loading should be below approximately 3% by weight, and preferably below approximately 2% by weight. The elastic response of these conductive elastic composites was evaluated using a hanging weight. A gauge length of 3" was established under zero load for each 1" wide strip of conductive elastic composite. A weight of 650 g was hung from the conductive elastic composite strip, and the resulting elastic deformation was measured.

The elasticity of the conductive elastic composite decreases with increasing additives (i.e., the carbon fibers and the carbon nanotubes). The sensitivity of the elasticity to carbon fiber percentage was higher than the sensitivity of the elasticity for the carbon nanotube percentage. All properly cured samples returned to their original length. The sample resistivity was re-measured after stretching.

We also mapped the conductivity of the conductive elastic composites as a function of the additives (i.e., the carbon fibers and the carbon nanotubes). Carbon fibers do not contribute significantly to the conduction until present in concentrations exceeding approximately 5%. The carbon nanotubes contribute to conductivity at much lower percentages, and increasingly conductive systems have been made between 1 and 5% by weight (in other words, the conductive elastic composite is increasingly more conductive as the quantity of carbon nanotubes increases within the conductive elastic composite, e.g., between approximately 1%-5% carbon nanotubes by weight). To make these measurements, an ohm/square jig was used. This jig has a 1" square gap between two 1"×0.25" brass electrodes. Measurements were made on both top and bottom sides of each cast urethane composite. For each side, the resistance was measured unloaded, with modest pressure, under 10% stretch with pressure, and after-stretch. This was done for all samples, and 20% and 30% stretch conductivity measurements were made for a reduced set. The more highly filled samples (i.e., those with the highest concentration of carbon nanotubes) were the most conductive and had the least post-stretch change in resistance.

Elastomers that we believe can benefit from this two-component synergistic filler (i.e., the carbon fibers and the carbon nanotubes) include natural rubber, epoxidized natural rubber, styrene-butadiene rubber, nitrile rubber, chloroprene rubber, ethylene propylene rubber, butyl rubber, chlorobutyl rubber, acryl rubber, silicone rubber, fluorine-containing rubber, butadiene rubber, epoxidized butadiene rubber, epichlorohydrin rubber, urethane rubber, polysulfide rubber, and mixtures thereof.

Other systems that can benefit from the two-component synergistic filler (i.e., the carbon fibers and the carbon nanotubes) include thermoplastic elastomers such as olefin-based elastomers, polyvinylchloride-based elastomers, polyester-based elastomers, polyurethane-based elastomers, polyamide-based elastomers, and polystyrene-based elastomers, and mixtures thereof.

Non-elastomeric systems may also benefit with increases in conduction from the synergistic effect provided by a combination of the two different additives (i.e., the carbon fibers and the carbon nanotubes). By way of example but not limitation, epoxies and other systems that are filled with nanotubes have been described in the literature, but there has been no previous teaching of the two-component synergistic filler of the present invention (i.e., carbon fibers in combination with carbon nanotubes).

Thus it will be seen that in one aspect of the present invention, the synergistic combination of the carbon fibers and carbon nanotubes enables the construction of conductive elastic composites that do not loose their conductivity, when stretched, as rapidly as those of the prior art.

EXAMPLES

Example 1

A two-part polyurethane elastomer system, from Crosslink Technologies CLC-1A-020, is mixed in a ratio of 100:39 for the resin (part A) and curing agent (part B). Five (5) percent (by weight) of industrial grade carbon nanotubes, made by NanoLab, Inc. of Waltham, Mass., was weighed out. These carbon nanotubes have diameters in the range of 10 nm and lengths of approximately 20 microns or greater. These carbon nanotubes were mixed with the part A resin, using a three roll mixer. These mixers can produce high shear forces, which are useful for dispersing the carbon nanotubes in the part A resin. The gap between rollers was reduced after each pass of the resin and carbon nanotubes through the mixer. After several passes through the mixer, the viscosity of the mixed resin had increased, indicative of a dispersed state (i.e., indicative of the carbon nanotubes being dispersed within the resin). The gap between the rollers was widened again, and 1% (by weight) of 11-14 micron diameter carbon fiber from Asbury Carbon (AGM 99) was mixed into the mixture of part A resin/carbon nanotubes. At this point, the mixture of part A resin/carbon nanotubes/carbon fiber was paste-like, and non-flowing by gravity. The curing agent (part B of the two-part system) was weighed out, and mixed with the filled part A (i.e., the mixture of resin/carbon nanotubes/carbon fiber) using a static mixer. Once mixed, the material was more fluid, and could be cast using a knife-over-roll technique onto a Mylar or other carrier film. A 0.005" strip was cast by setting the knife height over the carrier. After curing at 80° C., the strip had a resistance of 644 ohms/square in the unstretched state, and 569 ohms/square when stretched by 140% of its original length in the casting direction. This corresponds to a 12% decrease in resistance after stretching. Upon release, the composite returned to a value of 640 ohms/square.

Example 2

The procedure followed in Example 1 was followed, except that only 1% Asbury Carbon AGM 99 carbon fiber and 5% industrial grade carbon nanotubes ("IG-CNT") were milled into the part A resin, and the part B curing agent was mixed into the filled part A (i.e., the mixture of resin/carbon nanotubes/carbon fiber) using a centrifugal mixer under vacuum. The mixer, from Flackteck, Inc., enabled the rapid and thorough blending of the two components (i.e., the filled part A resin and the part B curing agent) with the simultaneous removal of entrapped air from the composite. The filled part A resin (i.e., the mixture of resin/carbon nanotubes/carbon fiber) was spun under vacuum for 20 seconds at 2000 rpm to release trapped air, and then the part B curing agent was added, and the process repeated. After coating onto a carrier film using the knife-over-roll method to 0.005", the material was cured at 80 degrees C. The strip had a conductivity of 2100 ohm/square inch in the unstretched state, and 2000 ohm/square inch in the 110% stretched state. The exclusion of air from the cured sample appears to have reduced the tendency for resistance change during stretch.

Example 3

A natural rubber was solvated in turpentine to a syrup-like consistency. Three percent (by weight) single wall carbon nanotubes and 2% (by weight) carbon fiber Asbury Graphite AGM 99 were mixed with the rubber using a Danbury-style mixer. After compounding, the solvated rubber composite was cast into a strip and the solvent allowed to evaporate. The shrinkage of the composite during drying enabled the components to settle into a highly conductive form.

Example 4

Four percent (by weight) NanoLab Industrial grade carbon nanotubes and 1% (by weight) Asbury Carbon AGM95 carbon fiber was added to the "part A" side of a Dow Corning 3631 2-part silicone elastomer. After hand mixing, the material was processed in a Danbury mixer under vacuum to exclude air. Then the "part B" side of the 2-part silicone elastomer was added and the material was immediately cast into a film using a knife-over-roll method.

| Best Method | | |
|---|---|---|
| Component | Supplier Specification | Weight percentage |
| Resin | CLC-1A-020 Part A | 66.2 |
| Carbon nanotubes | NanoLab IG-CNT (PD15L5-20) | 5 |
| Carbon Fiber | Asbury Carbon AGM99 | 2 |
| Curing Agent | CLC-1A-020 Part B | 25.8 |
| Anti tack additive | Talc, submicron | 1 |
| Total | | 100 |

To the part A CLC resin, the carbon nanotubes are added and roughly mixed before being placed through a three-roll compounder. The material is passed three times through the three-roll mill at successively smaller roller-gap spacing: 0.01", 0.005" and 0.0025". The viscosity of the mixture (part A resin and carbon nanotubes) increases substantially as the carbon nanotubes are dispersed within the resin. Following the pass at 0.0025", the gap is widened back to 0.005" and the AGM99 carbon fiber and talc are mixed with the part A resin and carbon nanotubes, and the mixture is run through the mill. The filled resin (i.e., the part A resin and carbon nanotubes and carbon fiber) can be stored in this state, as re-agglomeration did not seem to occur in the times studied (weeks).

The resin is then mixed with the part B curing agent prior to coating. Air elimination is advantageous to achieving a product with acceptable finish, elasticity and conductivity. A Flacktek centrifugal mixer with a vacuum attachment is the current best-practice known to enable simultaneous de-airing and mixing. A successful method was to de-air the filled resin (i.e., the part A resin/carbon nanotubes/carbon fiber) by running the Flacktek mixer for 20 seconds under vacuum at 2000 rpm, followed by the addition of the part B curing agent and running the mixer again under vacuum for an additional 20 seconds at 1000 rpm. Additional time initiated the cure of the compound due to self heating. After mixing, the material should be immediately coated on a carrier or liner using a knife-over-roll technique or other coating method amenable to highly viscous fluids. The gap was set at the desired height, as the material does not change dimensions significantly during gelation/curing. Gel times for this system are approximately 10-15 minutes. Other additives or formulations are available with shorter or longer pot lives. After casting, the composite should be cured following the curing cycle recommended by the manufacturer. For this example, the cast sheet was heated to 60-80 degrees C. for curing for 30 minutes minimum to gel and initiate cure. Curing continued at room temperature, and after 24 hours, the cure is typically complete and the composite has attained its final properties.

MODIFICATIONS OF THE PREFERRED EMBODIMENTS

It should be understood that many additional changes in the details, materials (e.g., shape memory polymers that are permanent or that dissolve over time, or carbon nanotube based), steps and arrangements of parts, which have been herein described and illustrated in order to explain the nature of the present invention, may be made by those skilled in the art while still remaining within the principles and scope of the invention.

What is claimed is:

1. A conductive elastic composite that can be elastically stretched to >120% of its original length, without more than a 20% change in electrical resistance, comprising an elastomeric matrix, carbon nanotubes and carbon fibers;
    wherein the carbon nanotubes are present in a concentration of less than 7% by weight, and the carbon fibers are present in a concentration of less than 4% by weight; and
    wherein the carbon nanotubes have a diameter of approximately 10-20 nm and a length of approximately 5-20 microns, and further wherein the carbon fibers have a diameter in the range of 5-20 microns and a length greater than about 250 microns.

2. The conductive elastic composite of claim 1, where the elastomeric matrix is selected from the group of consisting of natural rubber, epoxidized natural rubber, styrene-butadiene rubber, nitrile rubber, chloroprene rubber, ethylene propylene rubber, butyl rubber, chlorobutyl rubber, acryl rubber, silicone rubber, fluorine-containing rubber, butadiene rubber, epoxidized butadiene rubber, epichlorohydrin rubber, urethane rubber, polysulfide rubber, olefin-based elastomers, poly(vinyl chloride)-based elastomers, polyester-based elastomers, polyurethane-based elastomers, polyamide-based elastomers, polystyrene-based elastomers, other thermoplastic elastomers, and mixtures of the foregoing.

3. The conductive elastic composite of claim 1, wherein the elastomeric matrix is a two-part urethane.

4. The conductive elastic composite of claim 1, wherein the carbon nanotubes are multiwalled, with a purity of approximately 85% or greater.

* * * * *